INVENTORS
REGINALD TAYLOR
GEORGE THOMAS BAKER
BY McWatters Owen
ATTORNEY

INVENTORS
REGINALD TAYLOR
GEORGE THOMAS BAKER
BY Mc Watters Owen.
ATTORNEY

INVENTORS
REGINALD TAYLOR
GEORGE THOMAS BAKER

BY Chas. Lee. Candy
ATTORNEY

INVENTORS
REGINALD TAYLOR
GEORGE THOMAS BAKER
BY Chas. W. Candy
ATTORNEY

Patented Apr. 24, 1951 2,550,208

UNITED STATES PATENT OFFICE 2,550,208

CIRCUIT FOR THE TRANSMISSION OF IDENTIFICATION AND METERING SIGNALS OF CALLING LINES

Reginald Taylor and George Thomas Baker, Liverpool, England, assignors to Automatic Electric Laboratories, Inc., Chicago, Ill., a corporation of Delaware Application March 1, 1946, Serial No. 651,294
In Great Britain March 23, 1945

15 Claims. (Cl. 179—9)

The present invention concerns improvements in or relating to telephone or like systems, and more particularly arrangements for transmitting signals identifying any particular line as may be required for instance in automatic toll ticketing schemes.

It has already been suggested to utilise the test or P conductor of a connection for identification signal transmission purposes, but difficulty has been encountered due to the interference caused by normal testing operations thereon. It is therefore preferable to provide an alternative signal transmission path, and in this connection it has already been appreciated that use may be made of the metering conductor for this purpose in exchanges in which such a conductor is solely employed for the specific purpose of metering on a so-called fourth wire metering basis. In this manner a clean signal transmission circuit is readily secured.

In many cases however the practice is to use the P conductor for metering purposes, metering being effected by the application of one or more pulses of positive battery to the P conductor of a selector train at the nearest point to the called party in the calling exchange, such as at the final selector or at an outgoing junction relay set. An earthed circuit including a series-connected rectifier and calling subscriber's meter then connects with the P conductor at the calling end of the train. The chief object of the present invention is to provide improved identification signal transmission arrangements for use on exchanges employing the P conductor for metering purposes.

Clearly, where a subscriber's meter connects with the P conductor in the line circuit, it is not possible to derive an additional clean circuit for identity signalling, since only the negative, positive and P leads are available through to the first selector via a particular level of which access can be had to relay sets which require to know the identity of the calling party, for instance an outgoing relay set associated with a toll line necessitating call recording on a ticketing basis.

However the modern tendency on line finder circuits and also on line circuits with an associated forwardly hunting uniselector is to provide a metering bank in addition to the usual negative, positive and P banks. Conveniently in these circumstances the necessary meter circuit rectifiers are removed from their individual positions in the subscribers' line circuits and placed in common equipment. This will comprise the line finder circuits in the former case, as shown in British Patent No. 462,910 or in a position between the uniselector switch multiple and the first selector in the latter case, as shown in an article in the Post Office Electrical Engineers Journal, vol. 32, part 4, entitled "Melbourne City West Exchange." It is to positive battery metering exchanges of the type including a separate metering bank on the line finder or subscriber's uniselector switch that the present invention finds its special application.

According to one feature of the invention, therefore, in a telephone system having facilities for the identification of calling lines and provided with preselecting arrangements having a contact bank or banks for the transmission of metering signals, the identification signals are transmitted over the metering banks of the preselecting arrangements and means are provided in a first selector accessible to the preselecting arrangements for transferring the connection of the metering bank to an additional bank of the first selector, said means being rendered operative when the first selector is set to a level on which identification is required.

A further requirement for the carrying out of the invention is that the first selectors over which access is had to ticketing circuits must be provided with a through signalling channel for identification purposes. The standard 200-outlet group selector of the two-motion vertical and rotary type has two sets of the usual negative, positive and P wipers and it is proposed that arrangements be made on a ticketing level, such that one wiper set is used in the usual manner on the toll ticketing level while a part of the corresponding level accessible to the other set of wipers is used for the purpose of providing an auxiliary signalling channel or channels.

According to a further feature of the invention, therefore, in a telephone exchange system having facilities for the identification of calling lines and provided with preselecting arrangements having a contact bank or banks for the transmission of metering signals and with first selectors having two wiper sets, the identification signals are transmitted over the metering banks of the preselecting arrangements and means are provided in the first selector for transferring the connection of the metering bank to the negative or positive wires of the alternative set of wipers, said means being rendered operative when the first selector is set to a level on which identification is required.

According to one embodiment of the invention, the metering bank is normally connected to the private wire in the first selector and the operation of said means transfers the connection of the metering bank to an additional bank of the first selector while according to a second embodiment of the invention the metering bank is normally connected to a source of earth potential in the first selector and the operation of said means transfers the connection of the metering bank to an additional bank of the first selector.

With the first embodiment arrangements may be made whereby the necessary earth supply to the subscriber's meter is only completed if the subscriber's line is in the calling condition, thus avoiding unnecessary drain of identification energy on incoming calls. The second embodiment enables a further reduction to be made in the drain of identification energy in that by suitable application of a biasing voltage substantially no signalling energy is taken by a calling line in the absence of the biasing voltage, which is applied only during identification signalling.

The invention will be better understood from the following description of two embodiments, reference being had to the accompanying drawings comprising Figs. 1 and 2 which should be arranged side by side with Fig. 1 on the left, and Figs. 3 and 4 which should be similarly arranged.

The telephone exchange concerned is assumed to be provided with calling line identification equipment of the type disclosed in United States Patent No. 2,292,977 in which each line of an exchange is allotted a code indicative thereof. In the case where connections are set up via a selected level of the first selector to an outgoing toll line relay set where information as to the identity of the calling party is required for ticketing purposes, line marking signals are caused to be applied to the metering leads of all line circuits on the exchange. In the example in question, the marking signals characteristic of the calling line concerned will extend over the metering lead and through the first selector to suitable receiving equipment in the outgoing relay set where storage is effected for ticketing purposes as and when required. Two or more static devices of the non-linear resistance type having normally a high resistance are provided per metering conductor and are interposed between each such conductor and the commoning points, a number of code marking and group switching relays being controlled from a stepping switch in order to apply alternating current signals to the different groups of non-linear resistance elements in order to break them down and pass signals indicative of the various lines over the respective metering conductors.

Figure 1:
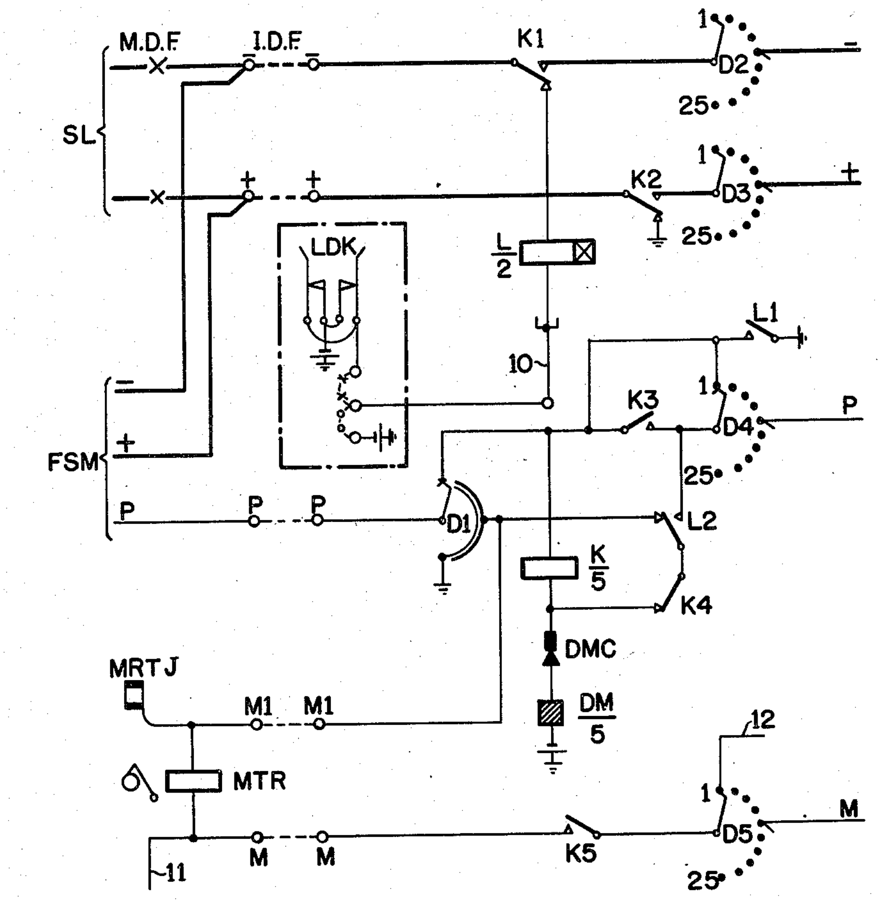
Fig. 1 shows a subscriber's line circuit of the homing uniselector type arranged for metering over a separate metering bank and adapted to meet the signalling requirements of the invention.

Referring now to Fig. 1, when the line SL is looped by the subscriber removing his receiver on an outgoing call, relay L is operated and in so doing busies the line circuit in the final selector multiple FSM and at the same completes a circuit for the uniselector magnet DM to step the wipers off-normal. Magnet DM continues to self-drive via wiper and bank D4 until a free first selector is found whereupon relay K operates in series with the magnet DM which cannot now operate so the rotation of that wiper is stopped. Relay K also disconnects relay L and switches the four leads through to the first selector taken into use.

Assuming that the subscriber wishes to set up a local automatic call, the first digit dialled will raise the selector wipers to a level giving access to a second rank of local switches, and after an automatic rotary search over the selected level the incoming leads are switched through over the odd or even set of wipers in the manner described in the above-mentioned United States Patent No. 2,137,423. When the connection is fully set up and the called party replies, metering is effected by the connection of positiove P lead of the connection in well-known manner. This positive battery extends via rectifier MRA, normal post springs NP (the use of which will be described later), and the operated contacts C of the selector relay C to the M lead which is connected to one side of the calling party's meter MTR, the other side being earthed via the paired plates of the homing bank D1 which are bridged together by wiper D1 when the uniselector moves off normal.

Figure 2:
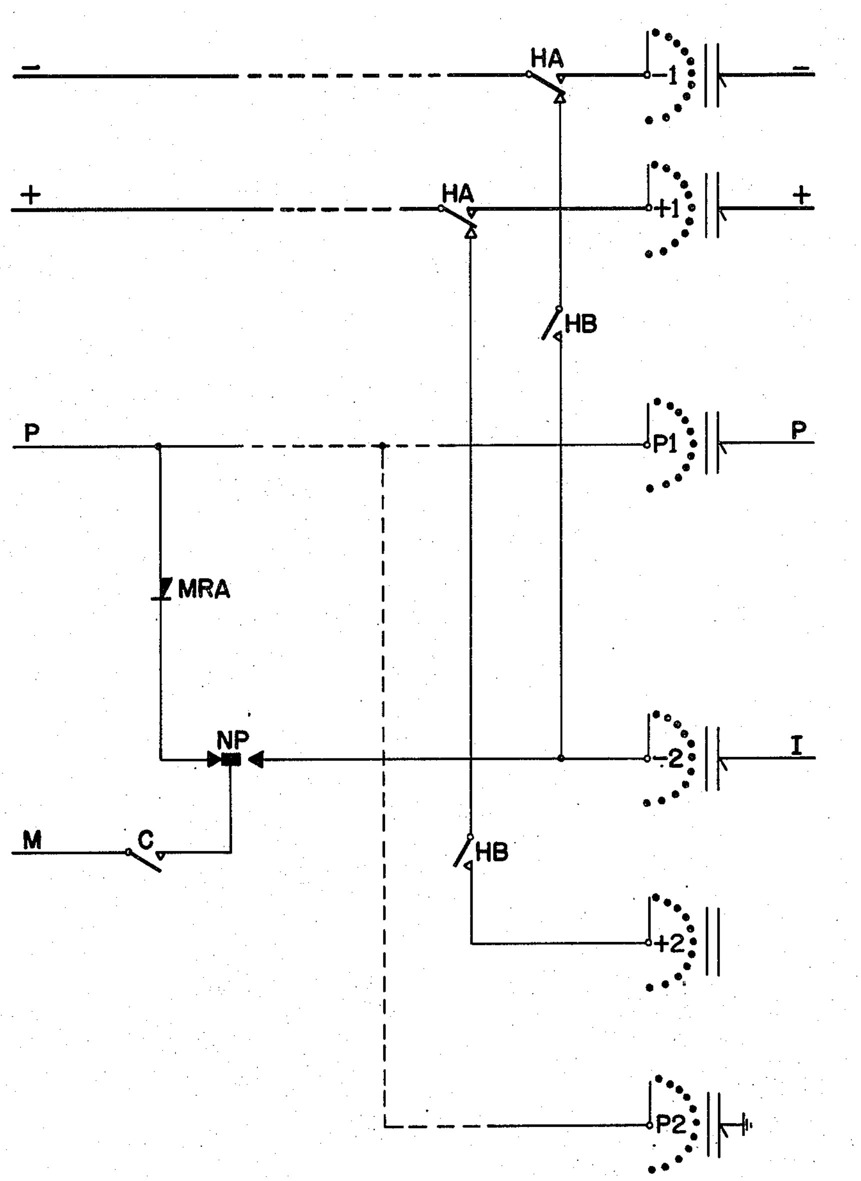
Fig. 2 shows the relevant circuit elements of a 200-outlet first numerical selector of the two-magnet vertical and rotary type having so-called rectangular release such as is described in United States Patent No. 2,137,423 and adapted to perform a 10/10 hunting function on toll ticketing levels.

Considering now the performance of the first selector, a level giving access to outgoing toll line relay sets which require call recording on a ticketing basis is shown in Fig. 2, and on this and similar levels the even set of ten outlets are not used for extending connection to subsequent switches. To ensure that the selector will not attempt to switch in to an even set of outlets on this level, all ten P2 outlets are earthed. The +2 set of outlets are left unwired while the −2 outlets are used to provide identification leads such as I through to the outgoing relay sets.

If the selector is set by the first digit to the toll ticketing level or one of such levels the normal post springs NP are mechanically operated and thereupon disconnect the metering lead M from its connection with the incoming selector P lead via rectifier MRA and transfer it to wiper −2. Hence when an outgoing relay set is taken into use on this level, the incoming selector negative, positive, P and M leads will be switched through to the negative, positive, P and I leads of the relay set.

At any appropriate time during or after the setting up of the connection, the outgoing relay set will cause the line identification equipment of the exchange to mark the metering leads of all line circuits with codes indicative thereof, the line circuit in question receiving its code markings via lead 11, Fig. 1. These code markings will extend over a clean circuit comprising leads M and I in series through to the outgoing relay set where they are received on suitable equipment for the purposes of call recording, for instance in the general manner described in United States Patent No. 2,369,868.

It will be noted that the earth supply to meter MTR is dependent on the off-normal condition of the line circuit uniselector D. This arrangement ensures that during the cycle of operation of the line marking equipment only those line circuits which have originated calls shall impose any drain on the identification signalling energy and thus line circuits which are not in use at the time, or which are in use on incoming calls, produce no shunt effect since their uniselectors will be occupying normal positions and hence will not be earthing the meters.

Figure 3:
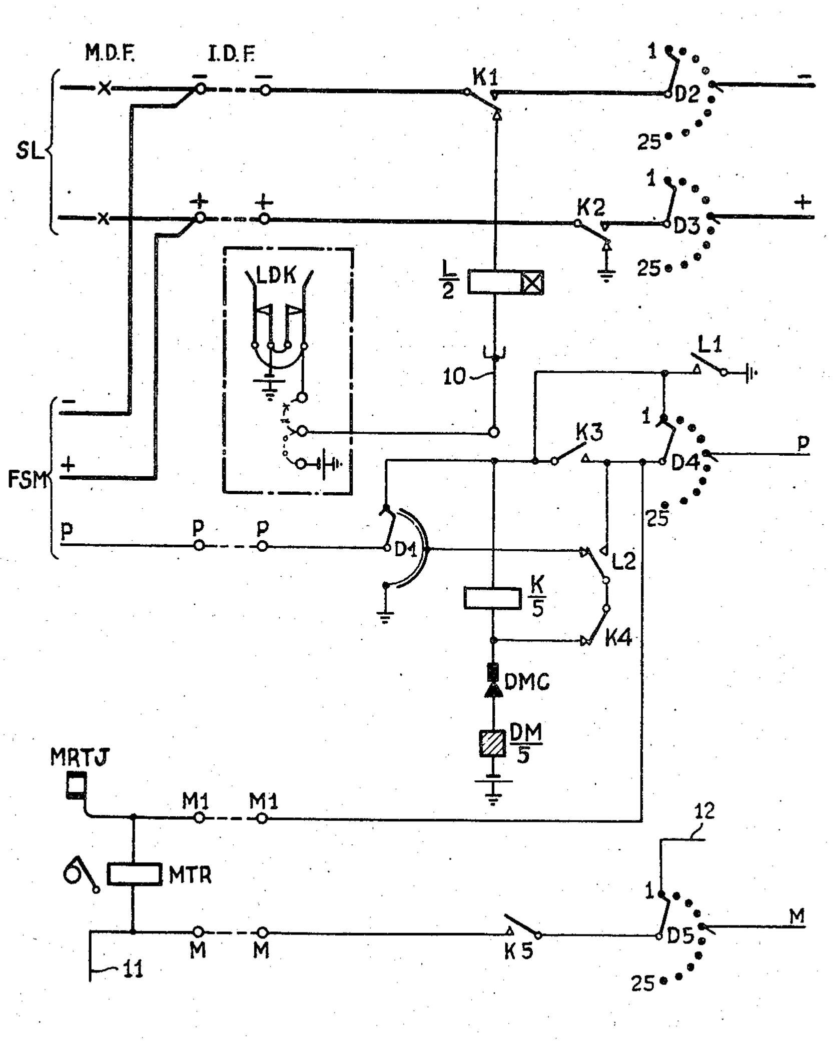
Figs. 3 and 4 show similar circuits to Figs. 1 and 2 modified to reduce the drain on the current source employed for identification purposes.
Figure 4:
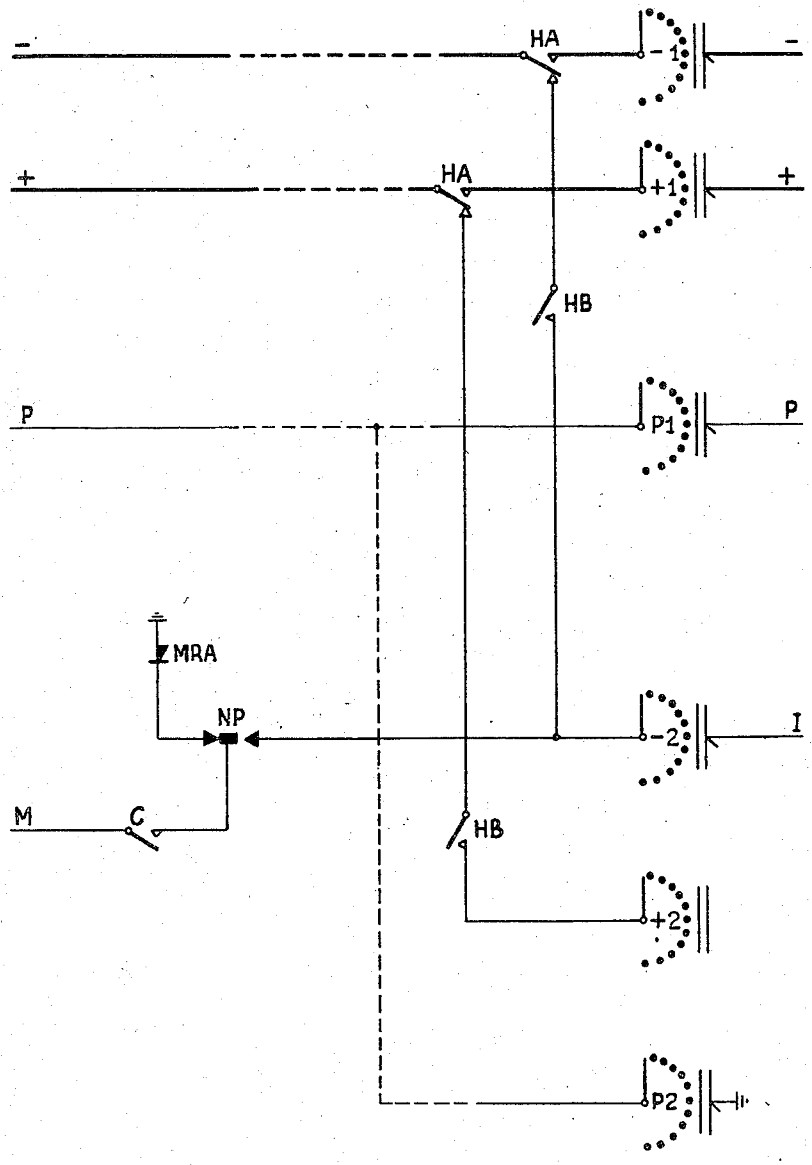

The circuit arrangement shown in Figs. 3 and 4 is similar to that shown in Figs. 1 and 2 but it has the advantage that it reduces the drain on the line marking source provided in the calling line identification equipment. It will be understood that in the arrangement of Figs. 1 and 2, the non-linear resistance elements are biased by earth potential applied to lead 11 from the relay set. Further, during the period when line marking is being effected, the resistance elements of all calling lines in the same group as the line under consideration will be marked by earth potential over wiper D1 so that line marking current will flow through the resistance elements of all such lines, resulting in a heavy drain on the line marking source. The problem can be solved by arranging for an increased biasing potential to be supplied to the non-linear resistance elements from the relay set and also by so selecting the resistance elements that the resistance for earth biasing voltage is high compared with that for the increased biasing voltage. Lines which are in a calling condition during the line marking period will thus take very little current and the drain on the line marking source will be considerably reduced.

If, however, such an increased biasing potential is applied to the circuit shown in Figs. 1 and 2, the meter will be operated and the arrangement shown in Figs. 3 and 4 enables an increased bias to be employed without this attendant disadvantage. The circuit of Figs. 3 and 4 differs from that shown in Figs. 1 and 2 in that the upper side of the meter is disconnected from bank D1 and connected instead to wiper D4 while the upper end of the rectifier MRA is disconnected from the P lead and connected to earth.

With this arrangement, the operation on a local call will be as previously described until the positive battery metering pulse is applied to the P1 wiper. This positive battery will extend over the P lead, bank contact and wiper D4, meter MTR, contacts K5, wiper D5 and bank contact, contact C, normal post springs NP, rectifier MRA to earth, resulting in operation of the meter.

On a call which involves the use of ticketing equipment, normal post springs NP are operated and positive battery is applied to the —2 and P1 wiper from the relay set. The resistance element associated with the calling line is biased by this positive potential over lead 11 and the positive potential is applied to both ends of the meter winding and therefore has no effect on the winding.

The line circuits, as shown in both embodiments conform to present-day meter routine testing requirements in which it is considered necessary to routine test the K relay contacts in circuit with the meter. For routine testing purposes access will be had to the line circuit over the final selector multiple FSM via a test selector in response to which relay K will be operated to connect up one side of the meter via wiper and bank D5 to test lead 12, while access will be had to the other side of the meter via the meter routine test jack MRTJ.

We claim:

1. In a telephone system having facilities for the identification and metering of calling lines and provided with preselecting arrangements having access to selector switches, a metering contact bank or banks for the transmission of both line identification signals and matering signals between a preselecting arrangement and a selector to which it is connected, a metering connection in said selector connected to the metering contact bank of said preselecting arrangement, an identification contact bank associated with said selector, and means in said selector for disconnecting said metering contact bank from said metering connection and for connecting said metering contact bank to said identification contact bank, said means operated in case said selector is set to a level on which line identification is required.

2. A telephone system as set forth in claim 1 in which said metering connection includes the testing conductor of said selector.

3. A telephone system as set forth in claim 1 in which said metering connection includes a connection to a source of earth potential in said selector.

4. A telephone system as set forth in claim 1 in which said means comprises normal post springs operated on levels requiring line identification.

5. A telephone system as set forth in claim 1 including also a meter connected to said metering contact bank and operable thereover responsive to the connection of a negative potential to said identification contact bank.

6. In a telephone system wherein line identification signals and metering signals are transmitted over the same contact bank or banks of a preselecting arrangement, a selector to which the preselecting arrangement has access, two wiper sets for said selector each set including a positive wiper and a negative wiper, metering signal control facilities connected to said contact bank in case said preselecting arrangement is connected to said selector, line identification control facilities including one of said wipers of one of said wiper sets, and means in said selector for disconnecting said metering control facilities from said contact bank and for connecting said line identification control facilities to said contact bank, said means being rendered operative in case said selector is set to a level on which line identification is required.

7. A telephone system as set forth in claim 6 in which the metering signal control facilities include the private wire of the selector.

8. A telephone system as set forth in claim 6 in which the metering signal control facilities include a connection to a source of earth potential in the selector.

9. A telephone system as set forth in claim 6 in which said means comprises normal post springs operated on levels requiring line identification.

10. A telephone system as set forth in claim 6 including a meter operable responsive to the connection of a negative potential to said one wiper.

11. In a telephone system a selector, a preselector having access to said selector, connections between said preselecting device and said selector include a private conductor and a metering conductor utilized for the transmission of both line identification signals and metering signals, a meter, and means for connecting said meter between said private conductor and said metering conductor, and further connecting means whereby said meter may be operated by a potential applied to one of said conductors and said meter is unaffected by a potential applied concurrently to both of said conductors.

12. In a telephone system in which a group of lines is equipped with meters individual to each of the lines and in which a conductor for transmitting electrical currents for line identification purposes is connected to each of the meters, a non-numerical switch for each of said lines, each switch having a home position from which it is operated responsive to the initiation of a call on the associated line, and means in a switch operated, when the switch moves from its home position, for connecting ground to the meter of the associated line thereby permitting current flow from said conductor only through meters associated with lines on which calls have been initiated.

13. A telephone system as set forth in claim 12 in which said means includes a wiper of said switch.

14. In a telephone system, a line, a metering lead extended from said line whenever a connection is extended therefrom, a meter for said line connected to said lead, a line code marking circuit also connected to said lead, means for connecting said lead either to a metering circuit or to an identification circuit as the connection is extended, and means in the metering circuit for preventing any effect of the connection of the line code marking circuit thereto.

15. In a telephone system, a line, a switch, a metering circuit, an identification circuit, a metering lead having a line code marking circuit and a meter for said line connected thereto, said lead being extended to said switch whenever a call is extended from said line, means in said switch for connecting said lead either to said metering circuit or to said identification circuit, and a nonlinear resistance in said metering circuit for limiting the effect of the connection of said line code marking circuit thereto.

REGINALD TAYLOR.
GEORGE THOMAS BAKER.

REFERENCES CITED

The following references are of record in the file of this patent:

UNITED STATES PATENTS

| Number | Name | Date |
|---|---|---|
| 2,137,423 | Taylor et al. | Nov. 22, 1938 |
| 2,292,977 | Taylor et al. | Aug. 11, 1942 |
| 2,298,453 | Bascom et al. | Oct. 13, 1942 |
| 2,369,868 | Taylor et al. | Feb. 20, 1945 |
| 2,370,736 | Kittredge | Mar. 6, 1945 |
| 2,372,353 | Bascom et al. | Mar. 27, 1945 |